(12) United States Patent
Nevo-Michrowski et al.

(10) Patent No.: US 12,170,392 B2
(45) Date of Patent: Dec. 17, 2024

(54) REPLACEABLE MODULAR DEVICE FOR HYDROGEN RELEASE

(71) Applicant: ELECTRIQ-GLOBAL ENERGY SOLUTIONS LTD., Tirat Carmel (IL)

(72) Inventors: Guy Nevo-Michrowski, Kadima Tzoran (IL); Roman Futerman, Nesher (IL)

(73) Assignee: Electriq-Global Energy Solutions Ltd., Tirat Carmel (IL)

( * ) Notice: Subject to any disclaimer, the term of this patent is extended or adjusted under 35 U.S.C. 154(b) by 0 days.

(21) Appl. No.: 17/826,442

(22) Filed: May 27, 2022

(65) Prior Publication Data

US 2022/0293977 A1 Sep. 15, 2022

Related U.S. Application Data

(62) Division of application No. 16/277,042, filed on Feb. 15, 2019, now Pat. No. 11,362,348.

(Continued)

(51) Int. Cl.
*H01M 8/04082* (2016.01)
*B01J 16/00* (2006.01)
(Continued)

(52) U.S. Cl.
CPC ....... *H01M 8/04208* (2013.01); *B01J 16/005* (2013.01); *B01J 19/0013* (2013.01);
(Continued)

(58) Field of Classification Search
CPC ......... H01M 8/04208; H01M 8/04201; H01M 8/04216; H01M 8/065; H01M 4/90;
(Continued)

(56) References Cited

U.S. PATENT DOCUMENTS 6,534,033 B1   3/2003   Amendola et al.
6,932,847 B2   8/2005   Amendola et al.
(Continued)

FOREIGN PATENT DOCUMENTS

CN   1608974 A   4/2005
CN   1647307 A   7/2005
(Continued)

OTHER PUBLICATIONS

Office Action issued in Japanese Patent Application No. 2021-506075, Jan. 30, 2023, and an English translation thereof (12 pages).

(Continued)

*Primary Examiner* — Sarah A. Slifka
(74) *Attorney, Agent, or Firm* — Finnegan, Henderson, Farabow, Garrett & Dunner, LLP

(57) ABSTRACT

A modular device for generating hydrogen gas from a hydrogen liquid carrier may include a housing;
an inlet for receiving the hydrogen liquid carrier; and at least one cartridge arranged within the housing. The cartridge may include at least one catalyst configured to cause a release of hydrogen gas when exposed to the hydrogen liquid carrier. The modular device may include a gas outlet for expelling the hydrogen gas released in the modular device and a liquid outlet for expelling spent hydrogen liquid carrier.

17 Claims, 11 Drawing Sheets

Related U.S. Application Data

(60) Provisional application No. 62/723,331, filed on Aug. 27, 2018, provisional application No. 62/658,635, filed on Apr. 17, 2018.

(51) Int. Cl.

| | | |
|---|---|---|
| *B01J 19/00* | (2006.01) | |
| *B01J 19/18* | (2006.01) | |
| *B01J 27/185* | (2006.01) | |
| *C01B 3/04* | (2006.01) | |
| *C01B 3/06* | (2006.01) | |
| *C01B 3/32* | (2006.01) | |
| *F17C 11/00* | (2006.01) | |
| *H01M 4/90* | (2006.01) | |
| *H01M 8/065* | (2016.01) | |

(52) U.S. Cl.
CPC .......... *B01J 19/18* (2013.01); *B01J 27/1853* (2013.01); *C01B 3/04* (2013.01); *C01B 3/065* (2013.01); *C01B 3/32* (2013.01); *F17C 11/005* (2013.01); *H01M 4/90* (2013.01); *H01M 8/04201* (2013.01); *H01M 8/04216* (2013.01); *H01M 8/065* (2013.01); *B01J 2219/00063* (2013.01); *B01J 2219/00162* (2013.01); *B01J 2523/305* (2013.01); *B01J 2523/51* (2013.01); *B01J 2523/845* (2013.01); *B01J 2523/847* (2013.01); *F17C 2201/018* (2013.01); *F17C 2221/012* (2013.01); *F17C 2270/0184* (2013.01); *H01M 2220/20* (2013.01); *H01M 2250/20* (2013.01)

(58) Field of Classification Search
CPC ........ C01B 3/065; C01B 3/32; B01J 27/0856; B01J 16/005; B01J 19/0013
See application file for complete search history.

(56) References Cited

U.S. PATENT DOCUMENTS

| | | |
|---|---|---|
| 7,097,813 B2 | 8/2006 | Ord et al. |
| 7,220,290 B2 | 5/2007 | Amendola et al. |
| 7,316,718 B2 | 1/2008 | Amendola et al. |
| 7,530,931 B2 | 5/2009 | Amendola et al. |
| 7,540,892 B2 | 6/2009 | Strizki et al. |
| 7,585,338 B2 | 9/2009 | Yoshizaki |
| 7,674,540 B2 | 3/2010 | Adams et al. |
| 8,506,659 B2 | 8/2013 | Ord et al. |
| 8,530,102 B2 | 9/2013 | Sarata et al. |
| 8,764,858 B2 | 7/2014 | Barton et al. |
| 8,821,834 B2 | 9/2014 | Curello et al. |
| 9,102,528 B2 | 8/2015 | Wallace et al. |
| 9,266,727 B2 | 2/2016 | Stimits et al. |
| 9,669,371 B2 | 6/2017 | Wallace et al. |
| 9,845,239 B2 | 12/2017 | Wallace et al. |
| 2003/0113259 A1 | 6/2003 | Rusta Sallehy et al. |
| 2003/0194369 A1 | 10/2003 | Prasad et al. |
| 2012/0328491 A1 | 12/2012 | Kelly et al. |
| 2014/0193304 A1 | 7/2014 | Cenci et al. |
| 2016/0272489 A1 | 9/2016 | Wang et al. |
| 2018/0214858 A1 | 8/2018 | Tokudome et al. |

FOREIGN PATENT DOCUMENTS

| | | |
|---|---|---|
| CN | 102923651 A | 2/2013 |
| CN | 106068238 A | 11/2016 |
| EP | 3006803 | 9/2017 |
| ES | 2387171 | 8/2013 |
| JP | 2004-000950 A | 1/2004 |
| JP | 2004-149394 A | 5/2004 |
| JP | 2006-000820 A | 1/2006 |
| JP | 4899474 | 3/2012 |
| JP | 2017-124394 A | 7/2017 |
| TW | 200305660 A | 11/2003 |
| TW | 200735449 A | 9/2007 |
| WO | WO 9957781 A1 | 11/1999 |
| WO | WO2017/127022 | 7/2017 |

OTHER PUBLICATIONS

Office Action issued in Chinese Patent Application No. 201980040758.9, dated May 13, 2022, and an English translation thereof (17 pages).

Office Action issued in Chinese Patent Application No. 201980040758.9, dated Feb. 3, 2023, and an English translation thereof (26 pages).

International Search Report and Written Opinion issued Jun. 12, 2019, in International Application No. PCT/IB2019/000162 (14 pgs.).

REPLACEABLE MODULAR DEVICE FOR HYDROGEN RELEASE

CROSS REFERENCE TO RELATED APPLICATIONS

This application is a divisional application of application Ser. No. 16/277,042, filed Feb. 15, 2019, which claims the benefit of U.S. Provisional Application No. 62/658,635, filed on Apr. 17, 2018, and U.S. Provisional Application No. 62/723,331 filed on Aug. 27, 2018. Each of the foregoing applications is incorporated herein by reference in its entirety.

BACKGROUND

Hydrogen has become an increasingly attractive source for clean energy production in recent years. For example, hydrogen may provide a highly efficient zero-emission energy source for mobility devices, such as cars, bicycles, aircraft or other electric-vehicles. While some hydrogen-powered systems utilize storage tanks to supply hydrogen for energy production, such systems give rise to technical concerns, such as weight, volume, efficiency, safety, and cost. Hydrogen fuel cells, however, may provide a safe, reliable source of on-demand energy in fuel cells through electro-oxidation reactions. Metal-borohydride fuels, for example, have a relatively high hydrogen content, making them an attractive fuel option for hydrogen production.

Such borohydride fuel cells often require a catalyst in contact with a hydrogen liquid carrier to facilitate the reaction of oxygen and hydrogen. A major hurdle in hydrogen fuel cell technology is developing a durable catalyst material that does not degrade too quickly over time. While advancements have been made in catalyst selection and design, durability of catalysts is often a limiting factor in the lifecycle of fuel cell technologies. Thus, in most systems, as the catalyst degrades, the productivity of the fuel cell is greatly reduced, and there is no way to replace the catalyst.

Accordingly, in view of these deficiencies, technological solutions are needed for a liquid hydrogen-based fuel cell allowing for replacement of the catalyst. Solutions should advantageously allow removal of the catalyst during a maintenance cycle. Additionally, the fuel cell device should have a modular design, allowing for repeated trays or cartridges that can be removed individually and replaced as needed. Such a device should allow for replaceable catalyst cartridges without sacrificing efficiency of the device or the capability of on-demand hydrogen production.

BRIEF DESCRIPTION OF THE DRAWINGS

The accompanying drawings, which are incorporated in and constitute a part of this disclosure, illustrate various disclosed embodiments. In the drawings.

SUMMARY

Figure 1:
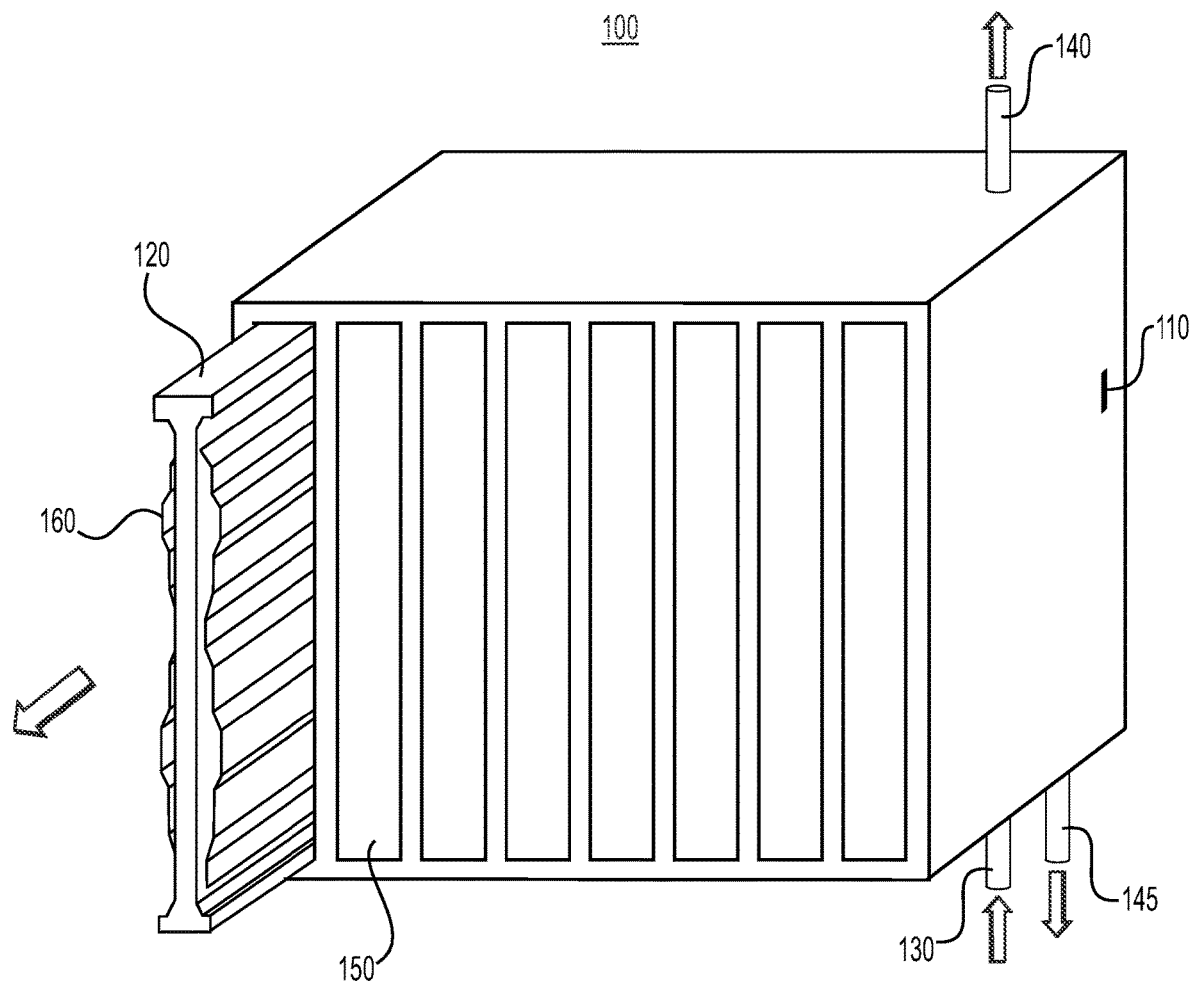
FIG. 1 illustrates an exemplary modular device with access ports for removal of cartridges.

The present disclosure relates to a modular device for production of hydrogen gas from a hydrogen liquid carrier. The modular device disclosed herein overcomes several technical problems. In typical hydrogen production devices, the lifecycle of the device is limited by the durability of the catalyst and, accordingly, catalyst degradation is a major hurdle in fuel cell technologies. As discussed below, the disclosed modular device may have a series of cartridges containing the catalysts used in hydrogen production. These cartridges may be removed from the modular device to be inspected or replaced. Further, the modular device may house as series of repeated interchangeable cartridges to decrease cost and to facilitate maintenance. Using the replaceable uniform cartridges in the disclosed modular device, the efficiency and lifecycle of a hydrogen gas production device can be dramatically improved.

Reference will now be made in detail to the disclosed embodiments, examples of which are illustrated in the accompanying drawings.

In one aspect, the modular device may include a housing, at least one inlet for receiving hydrogen liquid carrier, at least one cartridge arranged within the housing, and at least one gas outlet for expelling the hydrogen gas released in the modular device. The cartridge may include at least one catalyst configured to cause a release of hydrogen gas when exposed to the hydrogen liquid carrier. In some embodiments, the cartridge may include a central support structure with a catalyst mounted to one side of the central support structure. In other embodiments, the cartridge may have a catalyst mounted to either side of the central support structure. The cartridges may also be removable from the housing for inspection or maintenance. The cartridges may be arranged such that the hydrogen liquid carrier received from the inlet flows between the plurality of cartridges.

The modular device may include marginal cartridges, including at least one catalyst, on at least one end of the modular device. The marginal cartridge may also include a catalyst configured to cause a release of hydrogen gas when exposed to the hydrogen liquid carrier.

In some embodiments, the modular device may also include a cooling jacket containing a cooling fluid. The cooling jacket may be disposed within a central support structure of the cartridges. The catalysts may be attached to the cooling jacket using a heat transfer gel.

The modular device may include a canal within the housing configured to distribute the hydrogen liquid carrier from the inlet to the cartridges. The canal may include a main flow channel configured to receive the hydrogen liquid carrier from the inlet and distribute the fuel through branches to spaces between the cartridges.

The catalyst may include a metal structure with a catalytic coating. The coating may include an inner layer including Ni and an outer catalyst layer. In some embodiments, the Ni layer may have an Ra roughness value between the range of 6.3-25 μm. The catalysts may be arranged in a structured packing configuration.

In another embodiment, the modular device may include a housing; at least one inner cartridge arranged within the housing, the inner cartridge including at least one first catalyst configured to cause a release of hydrogen gas when exposed to the hydrogen liquid carrier; and a first marginal cartridge disposed within the housing on a first end of the housing and a second marginal cartridge disposed within the housing on a second end of the housing. The modular device may also include a cooling system for removing heat generated within the modular device; a fuel inlet for receiving the hydrogen liquid carrier; and a gas outlet for expelling the hydrogen gas generated in the modular device. The first marginal cartridge includes a second catalyst and the second marginal cartridge includes a third catalyst.

In another embodiment, the modular device may include at least two stackable cartridges, wherein each of the stackable cartridges comprises at least one first catalyst configured to cause a release of hydrogen gas when exposed to the hydrogen liquid carrier, and one or more structural elements configured to facilitate mating of the at least two stackable cartridges in order to form the modular device; at least one liquid inlet for receiving the hydrogen liquid carrier, wherein the at least one liquid inlet is disposed on one or more of the at least two stackable cartridges; at least one gas outlet for expelling the hydrogen gas released in the modular device, wherein at least one gas outlet is disposed on one or more of the at least two stackable cartridges; and at least one liquid outlet for expelling the hydrogen liquid carrier, wherein the at least one liquid outlet is disposed on one or more of the at least two stackable cartridges.

The modular device may be configured such that the at least one liquid inlet is located closer to a first end of the modular device than to a second end of the modular device; the at least one liquid outlet is located closer to the second end of the modular device than to the first end of the modular device; and the at least one gas outlet is disposed on a top of the one or more of the at least two stackable cartridges. In some aspects, the liquid inlet of one stackable cartridge may be configured to align with the liquid outlet of an adjacent stackable cartridge.

The modular device may be configured such that the one or more structural elements configured to facilitate mating of the at least two stackable cartridges include at least one of an aligning structure, detents, or aligned holes. The modular device may further comprise at least one seal disposed between the stackable cartridges.

In one aspect, the at least two stackable cartridges include a first and second marginal cartridge, wherein the first marginal cartridge is disposed at a first end of the modular device, and the second marginal cartridge is disposed at a second end of the modular device, and wherein the one or more structural elements of the of the first and second marginal cartridges are disposed only on a side of the cartridge facing internally to the modular device.

In one aspect, an exterior surface of the at least two stackable cartridges and an exterior surface of the at least one marginal cartridge may form an exterior housing of the modular device.

In one aspect, each of the first and second marginal cartridges comprise at least one second catalyst configured to cause a release of hydrogen gas when exposed to the hydrogen liquid carrier. The first catalyst and the second catalyst may be the same In another aspect, a method for performing maintenance on a catalyst of the modular device is disclosed. The method may comprise evacuating hydrogen gas and hydrogen liquid carrier from the modular device; opening at least one access port on a housing of the modular device, removing at least one cartridge from the modular device, the cartridge including at least one catalyst configured to cause a release of hydrogen gas when exposed to the hydrogen liquid carrier; and performing a maintenance operation including at least one of: inspecting the at least one catalyst for degradation, or replacing at least one of the at least one catalyst or the at least one cartridge.

DETAILED DESCRIPTION

The present disclosure relates to a modular device 100 for production of hydrogen gas from a hydrogen liquid carrier. While the present disclosure provides an example configuration for modular device 100, it should be noted that aspects of the disclosure in their broadest sense, are not limited to the specific embodiments disclosed.

Modular device 100 may generate hydrogen using a hydrogen liquid carrier. In one aspect, the hydrogen liquid carrier may include a known borohydride fuel such as potassium borohydride ($KBH_4$). In other aspects, the hydrogen liquid carrier may include another form of metal-borohydride ($M^1$-$BH_4$). The hydrogen liquid carrier may be a marketed liquid borohydride such as Electriq Global (EG) E-Fuel. While the present disclosure provides examples of liquid borohydride fuels, any other hydrogen liquid carrier suitable for the production of hydrogen may be used.

In accordance with the present disclosure, modular device 100 may be used to provide an on-demand source of hydrogen. For example, the hydrogen may be used to support a fuel-cell system requiring on-demand hydrogen production. Modular device 100 may be used to supply hydrogen for powering an electric vehicle such as a car, truck, bicycle, moped, golf-cart, or aircraft. Modular device 100 may also provide power for a fuel-cell-powered electronic device. Examples of electronic devices may include a cell phone or other mobile device, a laptop, a personal computer, a camera, a wearable electronic device, an IoT device, a medical device, a remote-controlled car or drone, or any other electronic device.

In accordance with the present disclosure, modular device 100 may include a housing 110. FIG. 1, for example, illustrates a modular device 100 with an exemplary housing 110. Housing 110 may be configured in any manner suitable for holding a series of internal removable cartridges. In some embodiments, the housing may be generally rectangular in shape. Alternatively, housing 110 may include a cylindrical vessel or other container. The hydrogen production process may require substantial heat and pressure and, accordingly, housing 110 may be designed to withstand these high operating conditions. For example, housing 110 may be constructed of a metal, such as stainless steel. In some aspects, housing 110 may have a single wall capable of containing the hydrogen production process. In other aspects, housing 110 may be fabricated with multiple layers or walls. Housing 110 may also have an external or internal coating as necessary to protect the housing or to isolate the hydrogen production reaction from potential contaminants. It is also envisioned that housing 110 may include a seal or other mechanisms for reducing or eliminating risks of leaks of fuel or hydrogen gas during operation.

Modular device 100 may also include an inlet 130 for receiving the hydrogen liquid carrier. There may be several possible configurations for inlet 130. The inlet can include, for example, one or more tubes extending from housing 110 of modular device 100. Inlet 130 may also include a flanged or threaded connection to connect to a fuel source. Inlet 130 may be welded directly to process piping to receive the hydrogen liquid carrier. Inlet 130 may include a valve or other components to control fuel flow into modular device 100 or otherwise facilitate use of modular device 100. Additionally, inlet 130 may be located at any location relative to modular device 100 and suitable for receiving hydrogen liquid carrier into modular device 100. As shown in FIG. 1, for example, inlet 130 may be positioned at the bottom of modular device 100.

Modular device 100 may also include a gas outlet 140 for expelling hydrogen gas produced within modular device 100. Similar to inlet 130, there may be several possible configurations for outlet 140. For example, outlet 140 may include a flanged or threaded connection to connect to a receiver of produced hydrogen fuel (e.g., a reservoir, one or more conduits associated with a power consuming device or system, etc.). Outlet 140 may also be welded directly to process piping to expel the hydrogen produced within the device. Outlet 140 may also include a valve or other components to facilitate transfer of produced hydrogen away from modular device 100. FIG. 1, for example, shows outlet 140 positioned at the top of modular device 100. Positioning connecting outlet 140 at the top of modular device 100 may be beneficial for collecting hydrogen gas that rises upward during the production process. It should be understood, however, that outlet 140 may be connected at any location suitable to expel the produced hydrogen from the modular device.

Modular device 100 may also include a liquid outlet 145 for expelling spent hydrogen liquid carrier from the modular device upon completion of the hydrogen generation process. Similar to inlet 130, there may be several possible configurations for outlet 145. For example, outlet 145 may include a flanged or threaded connection to connect to a receiver of produced hydrogen fuel (e.g., a reservoir, one or more conduits associated with a power consuming device or system, etc.). Outlet 145 may also be welded directly to process piping to expel the hydrogen produced within the device. Outlet 145 may also include a valve or other components to facilitate transfer of produced hydrogen away from modular device 100. FIG. 1, for example, shows outlet 145 positioned at the bottom of modular device 100. It should be understood, however, that outlet 145 may be connected at any location suitable to expel the hydrogen liquid carrier from the modular device.

Modular device 100 may also include at least one cartridge 120 arranged within housing 110. Cartridges 120 may be configured to include at least one catalyst 160. Catalyst 160 may be configured to produce hydrogen gas when exposed to the hydrogen liquid carrier, as discussed above. Catalyst 160 may be attached to the cartridge by screws, bolts, clamps, clips, locking mechanisms, welding, adhesive or any other means. Catalyst 160 may be configured in any manner suitable for production of hydrogen gas in contact with a hydrogen liquid carrier. For example, in some cases, catalyst may have a planar configuration. In other cases, as shown in FIG. 1, catalyst 160 may have a generally planar configuration, but with surface features configured for increasing a surface area associated with the catalyst (e.g., an undulating surface, faceted surface, roughened surface, etc.). Catalyst 160 may also be configured in various other shapes, for example to promote a flow of the hydrogen liquid carrier within modular device 100, or to maximize surface area. In some embodiments, catalyst 160 may be configured as a corrugated sheet or mesh. In other embodiments, catalyst 160 may be arranged in a structured packing configuration, such as a honeycomb, gauze, knitted, sheet metal, grid or other structured packing configuration. In other embodiments, catalyst 160 may include spherical or tubular structures.

In accordance with the present disclosure, the catalyst may include: a metal structure and a catalytic coating on the metal structure. The coating may include any material suitable for facilitating the production of hydrogen when in contact with the hydrogen liquid carrier. For example, the coating may include a layer including Ni. In some cases, the coating may include an outer layer disposed on the inner layer. The outer layer may include a component that is catalytic to the hydrogen production process. In some embodiments, the outer layer may include a Group III metal (e.g., Cobalt-P, Cobalt-B, Cobalt-Ni, P and Cobalt-NIB). While the present disclosure provides examples of a catalyst with a Ni-based coating, it should be noted that aspects of the disclosure in their broadest sense, are not limited to any particular composition or structure of catalyst.

In some embodiments, the metal structure of the catalyst may be composed of stainless steel. The catalytic coating on the metal structure (e.g., a Ni-based coating) may include a certain roughness value or range of roughness values, which may facilitate interaction between the catalyst material and hydrogen liquid carrier. In some embodiments, the catalyst coating including a Ni layer may have a roughness value between 6.3-25 µm calculated as the Roughness Average (Ra). While the present disclosure provides examples of exemplary roughness values, it should be noted that aspects of the disclosure in their broadest sense, are not limited to these particular values.

Figure 2:
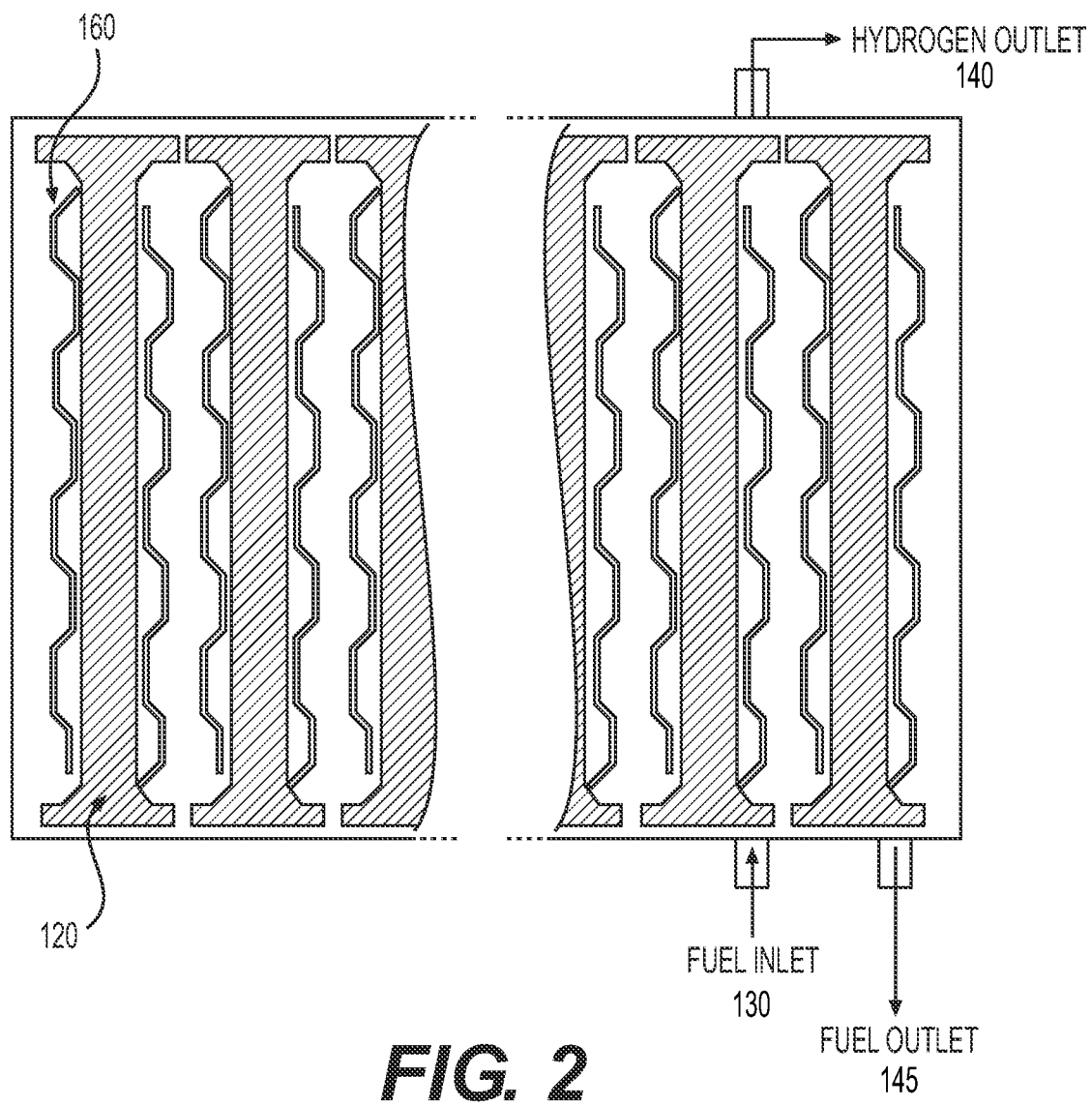
FIG. 2 is a cross-section view illustration of an exemplary modular device.

In some embodiments, modular device 100 may hold multiple cartridges. FIG. 2, for example, shows modular device 100 with multiple cartridges 120 arranged in parallel to one another. Cartridge 210 may be configured in any manner allowing removal from the modular device. For example, cartridge 120 may be configured as a circular disc or may be based on other geometric shapes, such as a hexagons or octagons. Cartridges 120 are shown in FIG. 1 in a vertical arrangement. It should be understood that cartridges 120 may be arranged in any other suitable configuration, such as horizontally or diagonally.

Figure 9A:
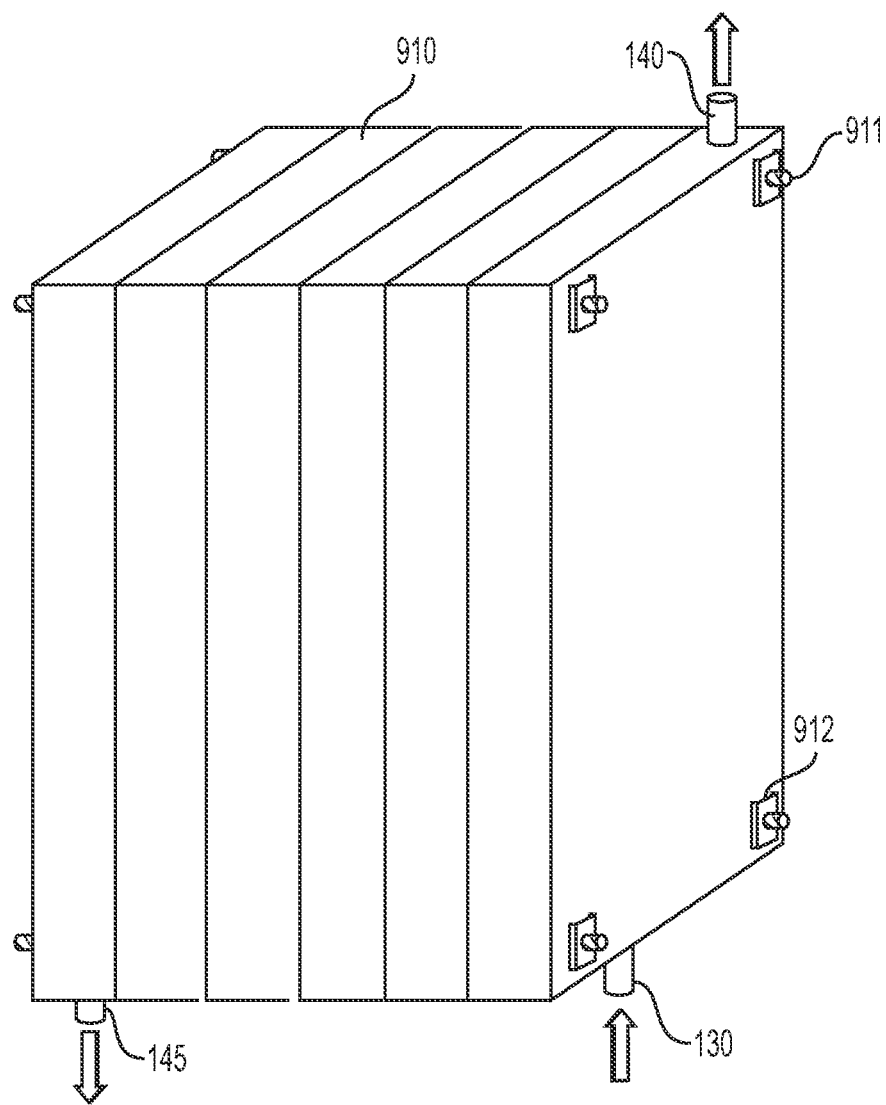
FIG. 9A illustrates an exemplary modular device in a stacked configuration.

In accordance with the present disclosure, the modular device may also be arranged in a "stacked" or "blocked" configuration. In this configuration, the modular device may not include a separate external housing but rather may be formed from a plurality of stackable cartridge blocks connected in series. The outer edges of the stackable cartridge blocks may form an exterior housing for the modular device. In this embodiment, the size of the modular device will depend on the number of cartridge blocks that are stacked to form the device. This embodiment allows further flexibility for hydrogen gas production by allowing the modular device to be scaled based on the application (e.g., the size of the device being powered, the type of the device being powered, the amount of hydrogen required, etc.). FIG. 9A shows an exemplary modular device 100 comprising a series of cartridge blocks 910 in a stacked configuration. Cartridge block 910 may, for example, be cartridge 120 as described above, configured to connect to other cartridges in series. It is understood that any references to cartridge 120 may also describe cartridge blocks 910 when the modular device is configured in a stackable configuration.

Figure 9B:
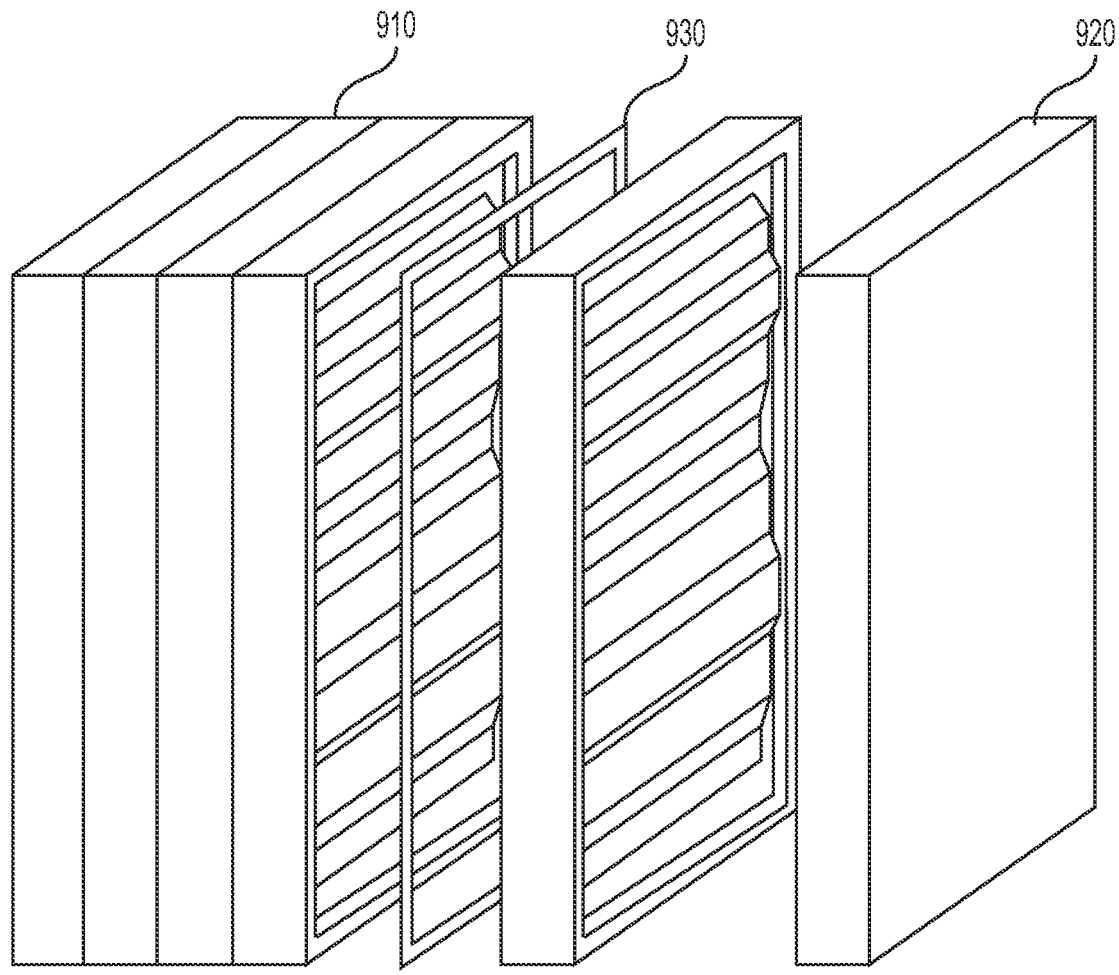
FIG. 9B illustrates an exemplary modular device in a stacked configuration with the cartridge blocks separated.

The cartridge blocks may be configured to connect to each other in various different ways. For example, the cartridge blocks may be held together by at least one threaded rod 911, such as a stud bolt, disposed through cartridge blocks 910. Cartridge block 910 may, for example, comprise a number of holes that align when placed next to other cartridge blocks. Threaded rod 911 may be inserted through the cartridges and tightened on either end using a nut or other fastener. A plate or washer 912 may also be disposed on threaded rod 911. It is anticipated that various other methods of connecting the cartridge blocks together (e.g., clamps, screws, bolts, locking mechanisms, etc.) may be used. The cartridge blocks may further be configured to align with adjacent cartridge blocks through various methods (e.g., aligning structure, detents, or aligned holes). It is further anticipated that a separate connector may be disposed between each of the cartridge blocks A modular device in the stacked configuration may include marginal blocks disposed on each end to enclose the modular device. The outer surface of marginal blocks, in combination with the outer surface/edges of the cartridge blocks, may form an exterior housing of the modular device. For example, FIG. 9B shows modular device 100 including marginal block 910. Marginal block 920 may also house a catalyst. For example, marginal block 920 may be marginal cartridge 420, described in detail below, configured to connect on one side to the cartridge blocks. The marginal cartridge may be configured to connect and/or align with adjacent cartridge blocks as described above. It is understood that any reference to marginal cartridge 420 may also describe marginal block 920. Various other methods may be used to enclose the modular device, for example using an endplate or cap connected to the cartridge blocks on either end of the modular device. Alternatively, cartridge blocks 910 may be self-contained, such that no end plate or marginal block 920 is needed. For example, cartridge blocks 910 may be configured such that the catalyst is fully enclosed. In this embodiment, flow may be diverted through modular device through channels or tubing internal to the cartridge blocks or through an exterior manifold connected to the blocks.

In the stacked configuration, the inlets and outlets of the modular device may be disposed on one or more of the cartridge blocks or marginal cartridge blocks. As shown in FIG. 9A, inlet 130 and outlet 140 may be disposed on one marginal block, with outlet 145 disposed on a marginal block on the opposite end of the modular device. The cartridge blocks may be configured such that the hydrogen liquid carrier flows through the cartridge blocks from one marginal block to the other. For example, each cartridge block may contain an inlet and an outlet such that the inlet of one cartridge block is configured to aligns with the outlet of an adjacent cartridge block when connected. Alternatively, the cartridge blocks may have internal plates to direct the flow through the cartridge block and into an adjacent cartridge block.

In other embodiments, all outlets and inlets of the modular device may be disposed on a single cartridge block or across a number of blocks. For example, inlets and outlets may be included on each of the cartridge blocks and connected via a manifold or other system. The inlets and outlets may also be closed on some of the blocks, for example using a valve, so that only the inlets and outlets on some of the cartridge blocks are used. As described above, while the inlet and outlet ports are shown in a vertical configuration in FIG. 9A, they may be arranged in a variety of orientations or placement locations. Other various configurations may be used to allow flow of the hydrogen liquid carrier in and out of the modular device and to allow the hydrogen gas to be expelled.

Modular device 100 may also include at least one seal, such as a gasket 930 or other sealing device, disposed between each of cartridge blocks 910 and/or the marginal blocks 920. Seal 930 may ensure that the hydrogen liquid carrier, the hydrogen gas, or other process fluids do not leak during operation of the modular device. Gasket 930 may also be integrally formed or connected to the cartridge blocks 910, marginal blocks 920 or the endplate or cap.

Figure 3:
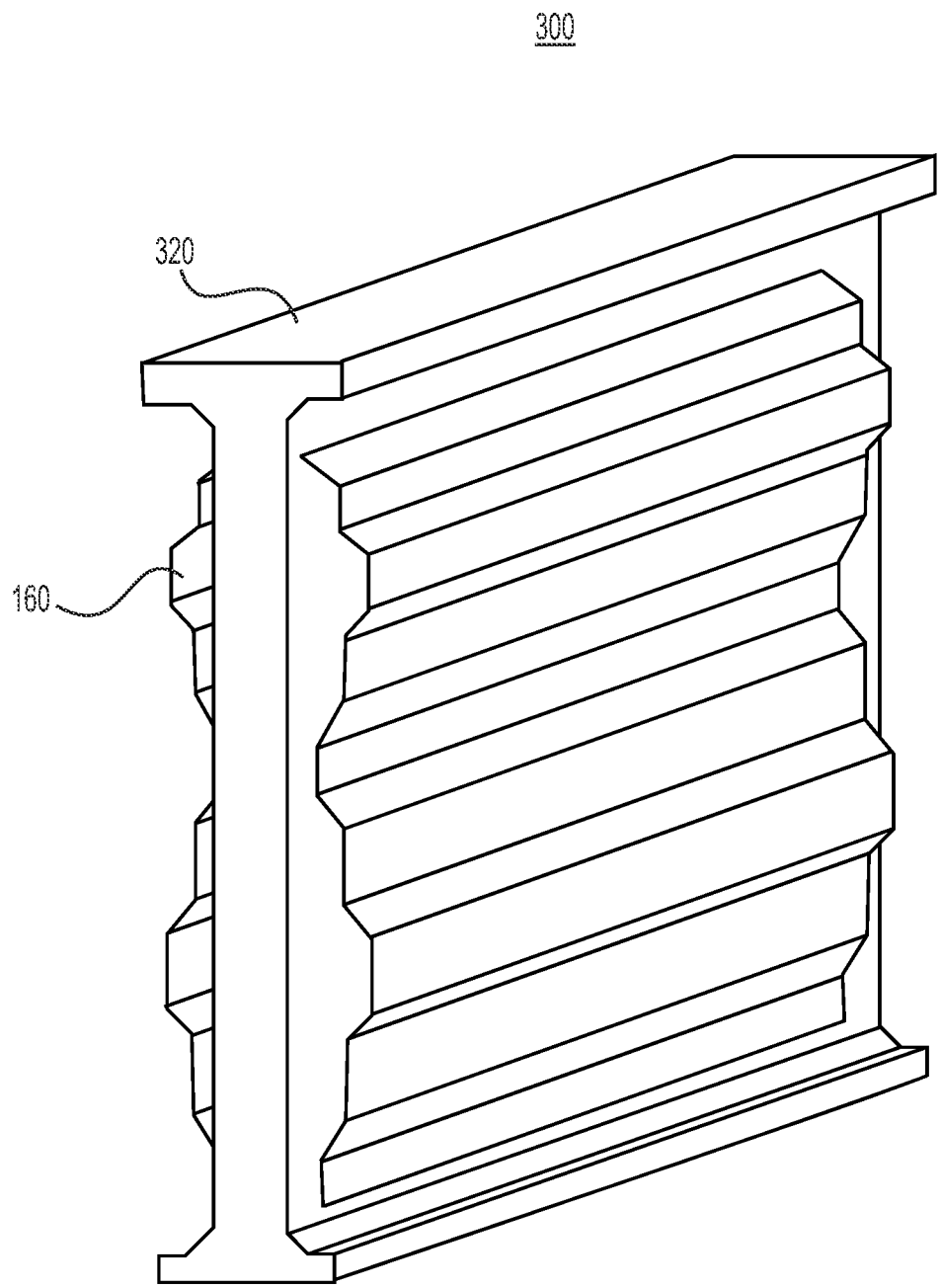
FIG. 3 illustrates an exemplary embodiment of a cartridge with two catalysts.

In accordance with embodiments of the present disclosure, cartridge 120 may also include a rigid central support structure with least one catalyst attached to the side of the support structure. For example, the cartridge may be configured to hold two catalysts, one attached to either side of central support structure 320. FIG. 3 shows an exemplary cartridge 120 with a catalyst attached to either side of support structure 320. Cartridge 120 may be arranged in any configuration suitable for facilitating contact between a hydrogen liquid carrier and a catalyst disposed on the cartridge. In some embodiments, the cartridge may be formed with a rectangular shape, with catalysts attached on either side. In other embodiments, the cartridge may house a series of catalysts connected to the cartridge at the top and the bottom, with no central support structure 320.

While FIG. 3 shows central support structure 320 in an "I" shaped configuration, it should be understood that central support structure 320 may have any other suitable configuration. For example, support structure 320 may be configured as a circular disc, a sphere, or with geometric shapes such as a hexagons or octagons.

In some exemplary embodiments, cartridge 120 may be removable from modular device 100 and housing 110. Cartridge 120 may be removed to inspect structures associated with cartridge 120. For example, during periodic maintenance, catalyst 160 may be inspected by removing cartridge 120 from modular device 100. For example, cartridge 120 may be inspected for damage or wear to the cartridge. Catalyst 160 may also be inspected for signs of degradation which can lead to decreased hydrogen production. Cartridge 120 or catalyst 160 may also be replaced with another cartridge 120 or catalyst 160 to continue operation. FIG. 1 shows an exemplary housing allowing removal of cartridge 120. Although FIG. 1 shows housing 110 with a series of access ports 150 for removal of each cartridge, it is contemplated that other means for removal of the cartridges may be provided. For example, housing 110 may have a single access port providing access to all cartridges. Access port 150 may include a closure mechanism, such as a door or a removable panel. In other embodiments, housing 110 may be removable from modular device 100 to allow removal of the cartridges. Housing 110 or modular device 100 may also have tracks, rollers, bearings or guides to facilitate removal of cartridge 120. Modular device 100 may also have a mechanism (i.e. clips, locks, bolts, screws, clamps, etc.) to hold cartridge 120 in place during operation.

Figure 4:
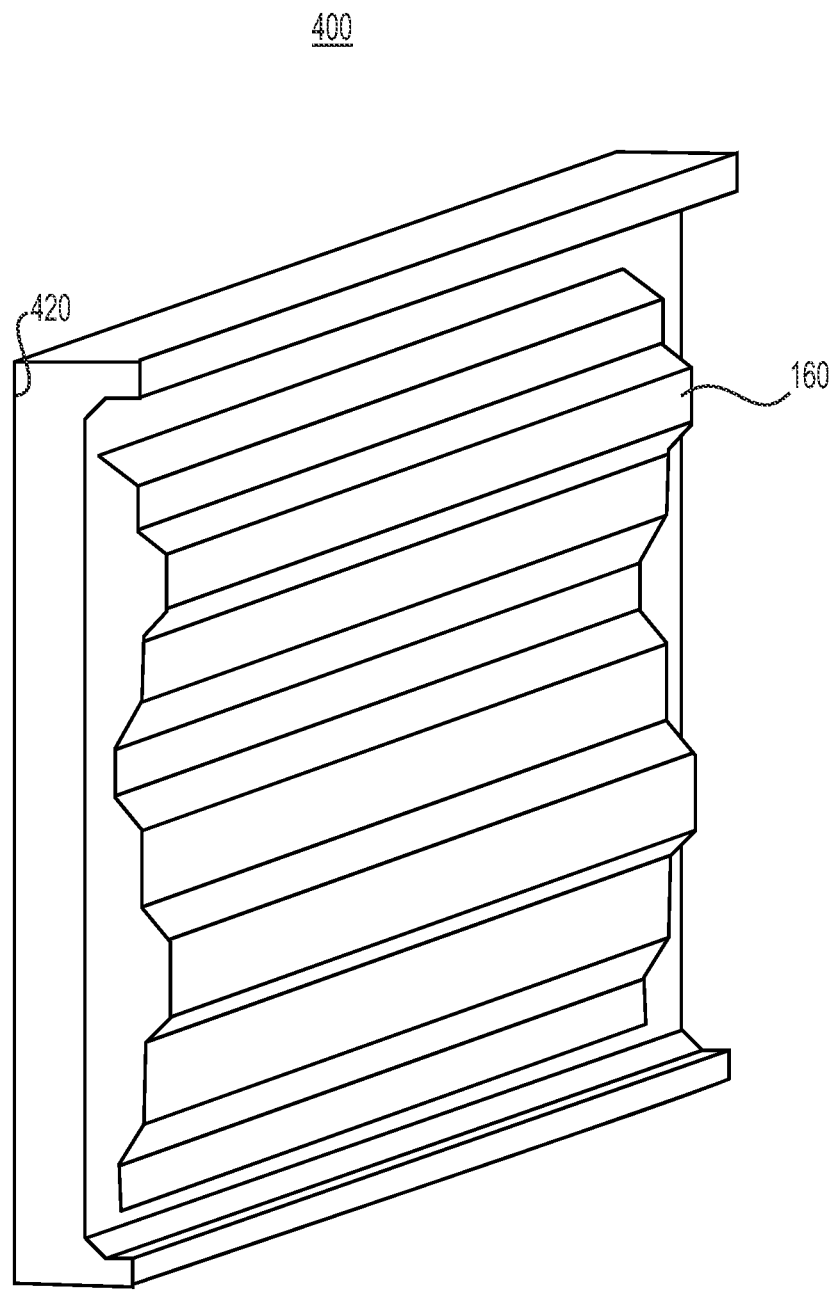
FIG. 4 illustrates an exemplary embodiment of a marginal cartridge with a catalyst on one side.

Other cartridge structures may be used in conjunction with the disclosed modular devices. For example, FIG. 4 shows an example of another cartridge 400. In this embodiment, cartridge 400 includes a marginal cartridge designed for placement on each end of the housing. For example, marginal cartridges 420 may have a catalyst attached to only one side of the cartridge facing the interior of housing 110. The catalyst of marginal cartridge 420 may be the same or different from the catalyst of cartridge 120. FIG. 4 shows an exemplary marginal cartridge 420. While FIG. 4 shows only one catalyst, it is envisioned that marginal cartridge could be configured to hold multiple catalysts. For example, marginal cartridge 420 may include two or more catalysts connected to one side of the cartridge and held in place at the top or bottom, or in another manner to allow flow of hydrogen liquid carrier between the catalysts. In some embodiments, marginal cartridges 420 may be specifically configured for placement on the ends of the modular device, for example, to receive hydrogen liquid carrier only from one side.

A modular device in accordance with the present disclosure may also include one or more cooling jackets disposed within the modular device. The cooling jackets may be used to dissipate heat generated during the hydrogen generation process. The cooling jackets may include a liquid disposed within the jackets. In some embodiments, the cooling jackets may contain a cooling fluid to promote heat distribution. The cooling fluid may consist of water, glycol, or some other gas or liquid coolant or combination thereof. The cooling jacket may contain a number of fins or baffles inside the jacket to promote heat transfer. Alternatively, the cooling jackets may be a shell and tube heat exchanger or other known heat transfer device. The cooling jackets may be included within the modular device by various alternative structures. The cooling jackets may, for example, be placed along the internal wall of the housing. Alternatively, the cooling jackets may be placed between or in line with the cartridges 160.

Figure 5:
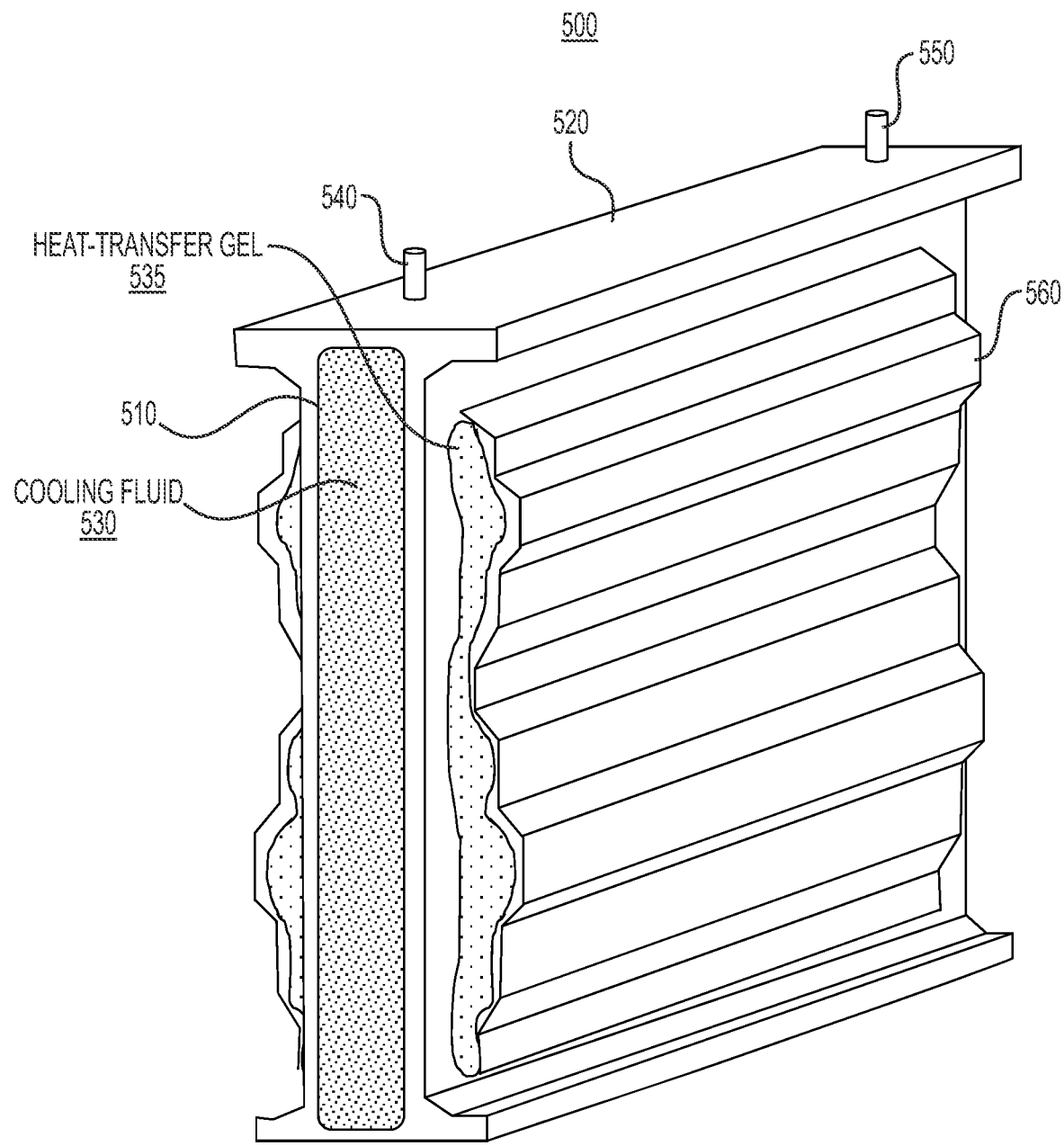
FIG. 5 illustrates an exemplary embodiment of a cartridge with an internal cooling jacket disposed within the cartridge.

The cooling jackets may also be disposed within the at least one cartridge. Each cartridge may have a dedicated cooling jacket internal to the cartridge. This allows heat generated during the hydrogen production process to be dissipated through cartridge 120. By way of example. FIG. 5 shows an exemplary cartridge with an integral cooling jacket. In this example, cartridge 500 has a central support structure 520. The cooling jacket 510 is integrated as a cavity within central support structure 520. Cartridge 500 may also include an inlet 540 and an outlet 550 for circulation of cooling fluid 530. As discussed above, cooling jacket 510 may further include baffles, fins or some other structure to promote heat transfer.

In accordance with embodiments of the present disclosure, the at least one catalyst may be attached to the cooling jacket with a heat transfer gel. By way of example. FIG. 5 shows cartridge 500 with integral cooling jacket 510. Catalyst 160 is attached to central support structure 520 and heat transfer gel 535 is disposed between catalyst 160 and cooling jacket 510 to promote heat transfer. It should be noted that other configurations of catalyst 160, central support structure 520 and cooling jacket 510 are envisioned and the cartridge shown in FIG. 5 is provided as an example only.

Figure 6A:
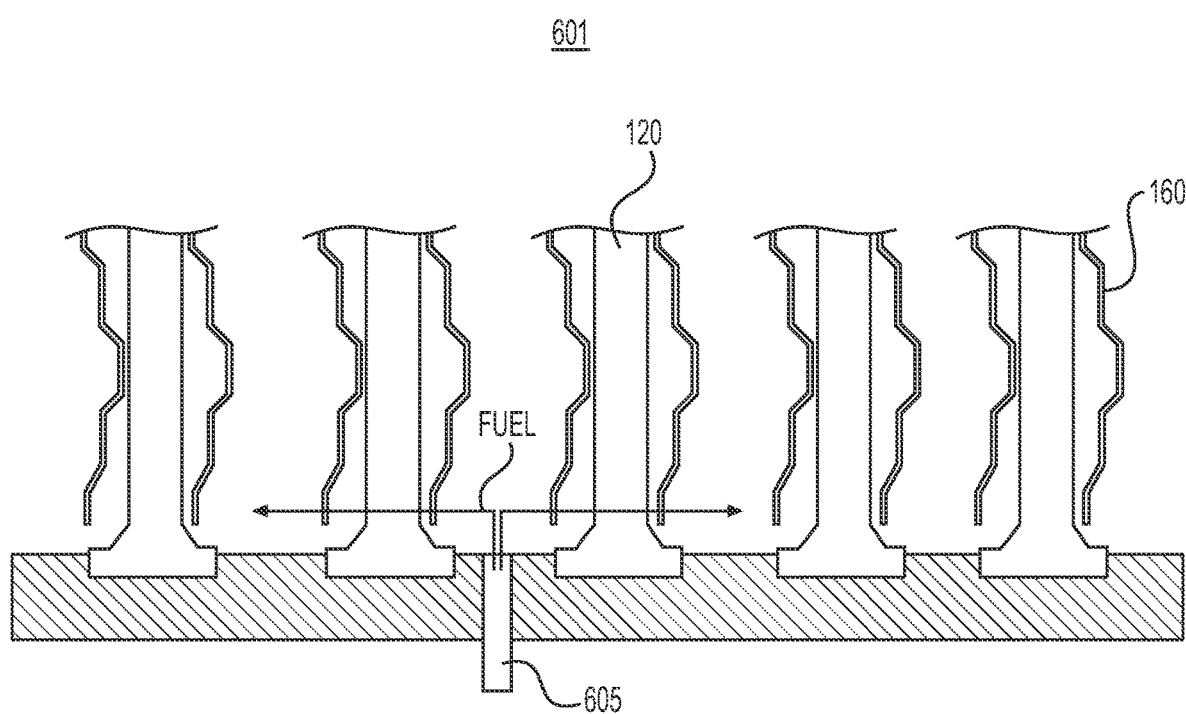
FIG. 6A illustrates an exemplary embodiment of the housing with fuel injected in a single port.

In some exemplary embodiments, modular device 100 may hold a plurality of cartridges or cartridge blocks arranged such that fuel received from the inlet flows between the plurality of cartridges. For example, fuel may be received from inlet 130 and directed into housing 110. Fuel may enter housing 110 at a single point or in multiple locations. Cartridges 120 may be arranged such that hydrogen liquid carrier can flow between the cartridges to spread across the device to contact all catalysts 160. FIG. 6A shows an exemplary modular device where fuel is injected at a single port 605. Fuel may flow between cartridges 120 to allow the hydrogen liquid carrier to contact each catalyst 160 attached to the cartridges. The arrangement in FIG. 6A is provided for example only and other embodiments are envisioned. For example, fuel may be injected at more than one location and dispersed between the cartridges.

In other embodiments, modular device 100 may further include one or more canals within the modular device. The canals may be configured to distribute the hydrogen liquid carrier from the inlet to the plurality of cartridges. Distributing the hydrogen liquid carrier between each of the cartridges may encourage distribution of hydrogen production across the catalysts. In some cases, distribution of the hydrogen liquid carrier among the cartridges may enable even or nearly even production of hydrogen among the catalysts. Such distribution can be accomplished by various alternative structures. In one aspect, a canal or system of canals may be formed integrally into housing 110. The canals, for example, may be machined or formed by other manufacturing processes directly into housing 110. In another aspect, the canals may be formed into a separate structure, such as a plate or manifold disposed within modular device 100. The fuel may also be distributed through tubing, piping, channels, or other internal structures within modular device 100. For example, the hydrogen liquid carrier may be injected through a fuel inlet on a marginal cartridge (or marginal cartridge block) on one end, then flow via internal channels through each of catalyst plates in series towards a marginal cartridge (or marginal cartridge block) on the opposite end of the device, where the spent hydrogen liquid carrier is expelled.

Figure 6B:
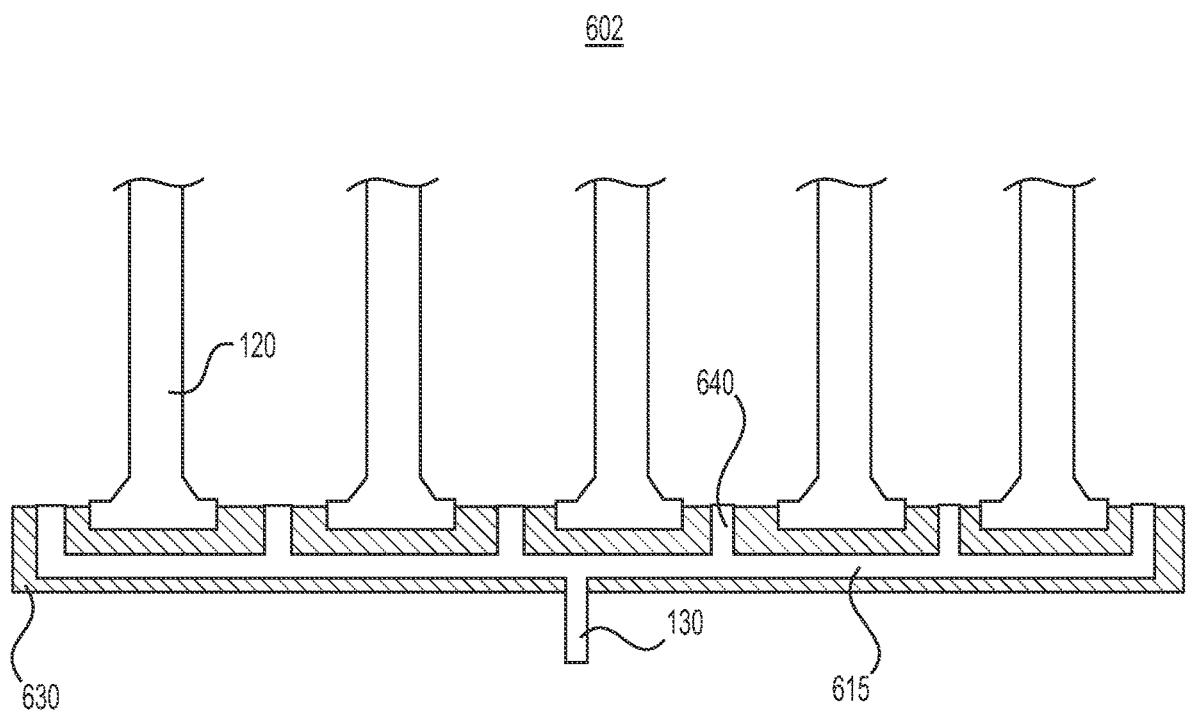
FIG. 6B illustrates an exemplary canal system for distribution of the hydrogen liquid carrier.

FIG. 6b shows an exemplary device configuration including a plurality of canals for distributing hydrogen liquid carrier among a plurality of cartridges. In accordance with exemplary disclosed embodiments, the canals for distributing the fuel may include a main flow channel configured to receive the hydrogen liquid carrier from the inlet, and a plurality of branches connecting the main flow channel to a space between the plurality of cartridges. For example, FIG. 6b shows a structure 630 disposed within modular device 100. Structure 630 is configured to receive fuel from below via inlet 130. Structure 630 has a main flow channel 615 for distribution of the fuel across modular device 100. Structure 630 also has multiple lateral branches 640 stemming from main flow channel 615. The lateral branches 640 direct hydrogen liquid carrier between each of cartridges 120 to promote even distribution.

In some embodiments, the hydrogen liquid carrier may be sprayed into modular device 100. In other embodiments, the hydrogen liquid carrier may flow into modular device 100 to immerse the catalysts in the hydrogen liquid carrier. In some embodiments the fuel may be allowed to flow naturally within housing 110. In other embodiments the hydrogen liquid carrier may be forced to circulate within housing 110. For example, modular device 100 may contain a pump or other means for circulating the fuel between the cartridges.

Figure 7:
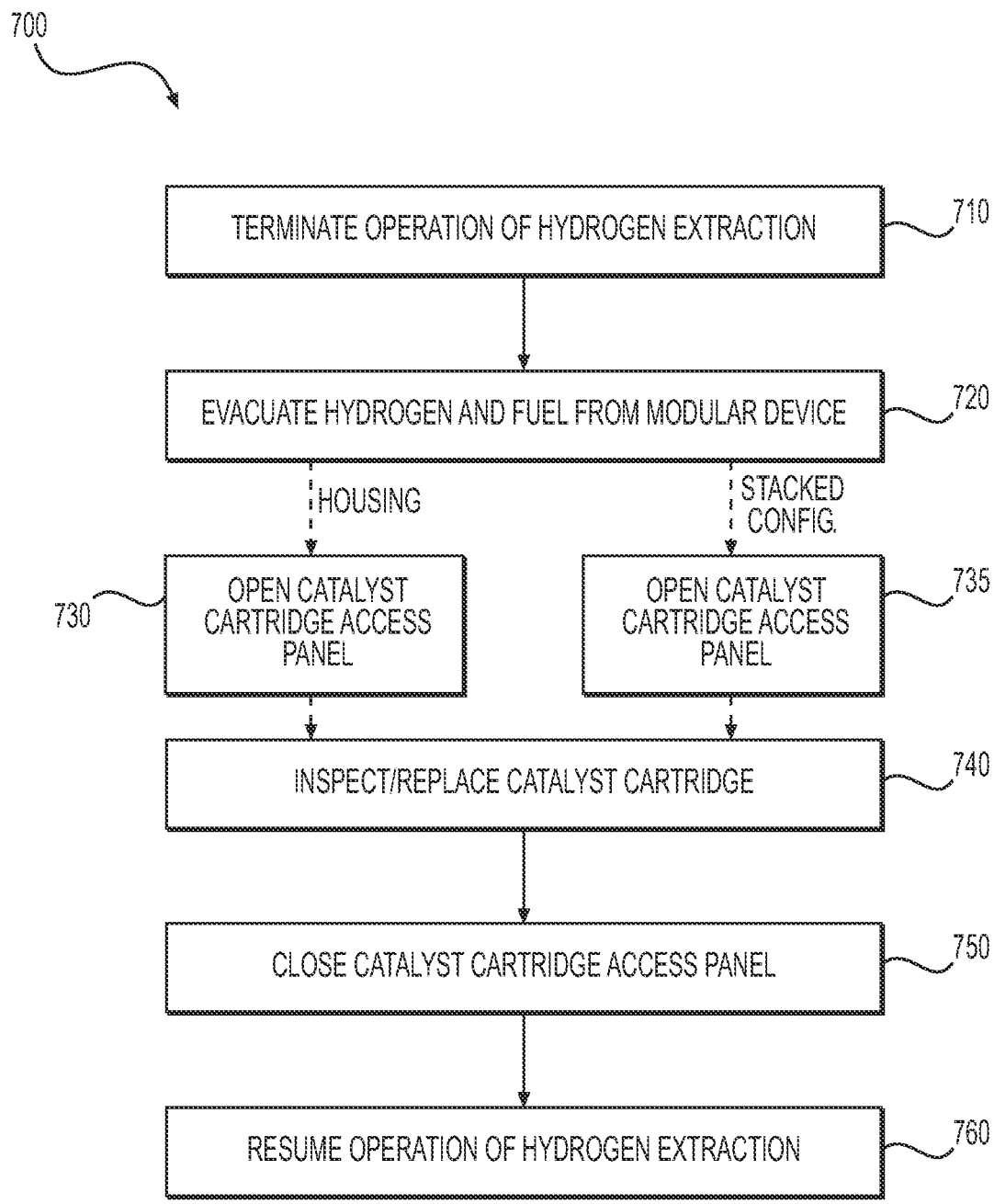
FIG. 7 illustrates an exemplary method of performing maintenance on the modular device.

FIG. 7 illustrates an exemplary method of performing maintenance on the modular device. In step 710, operation of the hydrogen extraction process is terminated once all of the hydrogen liquid carrier has been removed or depleted. In one aspect, operation of the modular device may be terminated manually. For example, an operator of the modular device may initiate the shut down of the device. In other aspects, the termination of operation may occur through an automated process. For example, termination of operation may be initiated by a computer configured to control modular device 100. Termination may also be initiated by an electronic device using modular device 100 for power production. It is envisioned that step 710 may include a number of sub-steps, such as closing valves or shutting down pump, heat exchangers, fans, heaters or other associated equipment.

Any remaining hydrogen and hydrogen liquid carrier may then be evacuated from the modular device in step 720. Modular device 720 may be evacuated fully to ensure the cartridges may be accessed safely. Step 720 may include draining the hydrogen liquid carrier through a drain provided in modular device 100. A number of sensors or other monitoring devices may also be used to ensure modular device 100 is safe for opening.

Next, if modular device 100 includes an external housing, a cartridge access panel in the housing may be opened to access cartridges 120, as shown in step 730. The access panel may include access port 150 as shown in FIG. 1. As described above, in some aspects of the disclosed invention, the access panel may provide access to a single cartridge. In this example, a single cartridge may be accessed, leaving the remaining cartridges in place. In other aspects, the access panel may provide access to multiple cartridges or to all of the cartridges. Alternatively, if modular device 100 is in a stacked configuration, as described above, the cartridge blocks may be disconnected from each other in step 735. Cartridge 120 may then be removed from the other cartridges or cartridge blocks. While cartridge 120 is referred to as an example, it is understood that the procedure described in method 700 and FIG. 7 may apply to other cartridge configurations. For example, method 700 may apply to marginal cartridges, such as marginal cartridge 420 as shown in FIG. 4. Method 700 may also apply to cartridges with internal cooling jackets, such as cartridge 500 as shown in FIG. 5.

In step 740, cartridge 120 or catalyst 160 may be removed and/or inspected as discussed above. For example, cartridge 160 may be inspected for damage or wear or for any other maintenance purpose. Catalyst 160 may be examined for degradation that may occur during the hydrogen production process. Cartridges 120 and catalyst 160 may also be removed for cleaning. In some embodiments, step 740 may include replacing cartridge 120 or catalyst 160, or both.

In step 750, the cartridge access panel is closed. It is envisioned that this step may include other sub-steps such as ensuring that a seal is made in housing 110. Step 750 may also require mechanically closing the access panel using, for example, screws, bolts, latches, clips, clamps, locks or other mechanical closure devices.

In step 760, operation of the hydrogen generation process may be resumed. This may include a reverse procedure of the additional steps described with respect to opening step 710. Step 760 may also include a safety procedure to ensure that operation of modular device 100 may be resumed.

Figure 8:
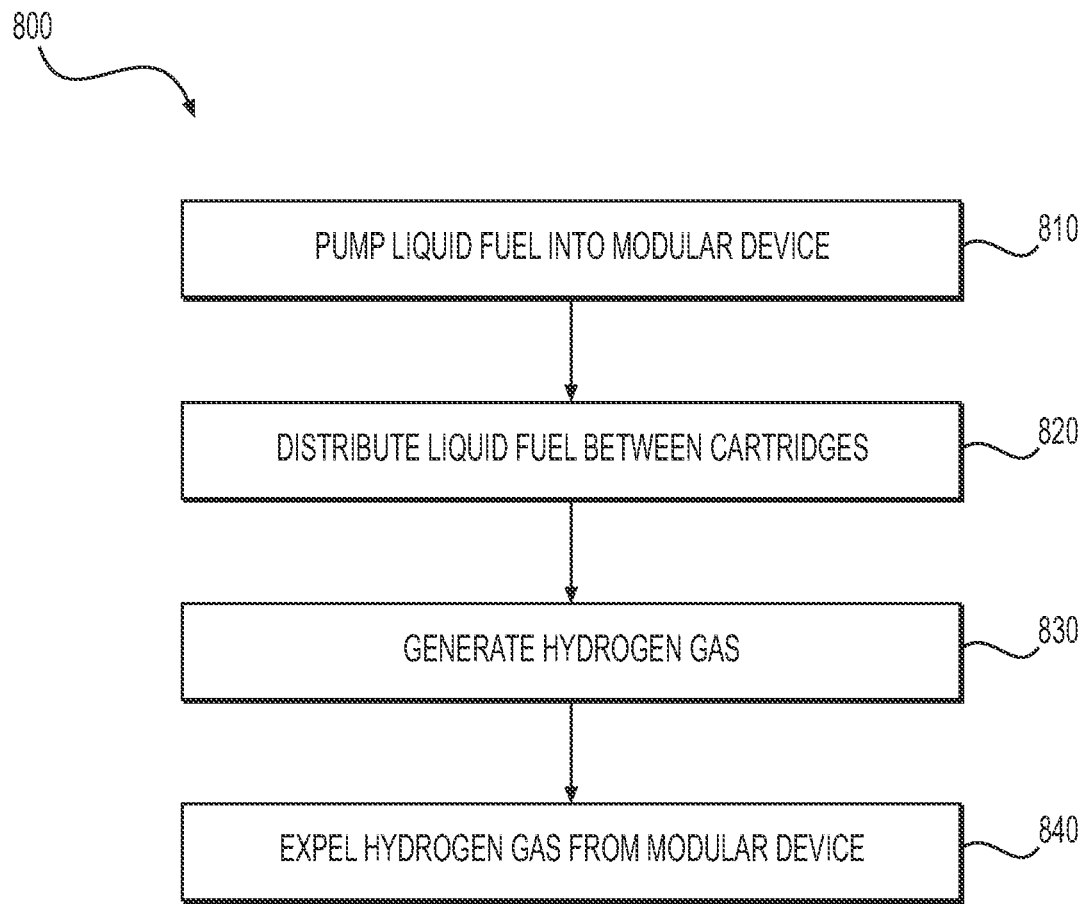
FIG. 8 illustrates an exemplary method for operating the modular device.

FIG. 8 illustrates an exemplary method for operating a modular hydrogen production device. In step 810, hydrogen liquid carrier (e.g., a hydrogen-based hydrogen liquid carrier) may be pumped into modular device 100. As discussed above, the hydrogen liquid carrier may include a borohydride fuel such as potassium borohydride ($KBH_4$). In other aspects, the hydrogen liquid carrier may include another form of metal-borohydride ($M^1$-$BH_4$). The hydrogen liquid carrier may be a commercially available liquid borohydride such as Electriq Global (EG) E-Fuel. The hydrogen liquid carrier may be received through inlet 130.

In step 820, the hydrogen liquid carrier is distributed between cartridges 120. In some aspects of the disclosed invention, the hydrogen liquid carrier may enter housing 110 at a single point or in multiple locations and may flow between cartridges 120, as shown in FIG. 6A. In other aspects, the hydrogen liquid carrier may be distributed between the cartridges as shown in FIG. 6B.

In step 830, hydrogen gas is generated as a result of the hydrogen liquid carrier making contact with catalysts 160. This may be accomplished by various alternative processes, including processes for production of hydrogen gas using a liquid borohydride fuel in contact with a catalyst. Hydrogen gas generated during step 830 may be expelled from the modular device in step 840. The hydrogen gas may be expelled through outlet 140 as shown in FIG. 100. The hydrogen gas may be used to supply a fuel cell to power an electronic vehicle or device as described above.

Several aspects of the disclosure were discussed above. It is noted that any feasible combination of features, aspects, characteristics, structures, etc. which were discussed above—for example, with respect to any one or more of the drawings—may be implemented as is considered as part of the disclosure. Some of those feasible combinations were not discussed in detail for reasons such as brevity and succinctness of the disclosure, but are nevertheless part of the disclosure, and would present themselves to a person who is of skill in the art in view of the above disclosure.

What is claimed is:

1. A modular device for generating hydrogen gas from a hydrogen liquid carrier, the modular device comprising:
    a housing including a plurality of access ports;
    at least one inlet for receiving the hydrogen liquid carrier;
    a plurality of cartridges arranged within the housing, wherein at least one cartridge of the plurality of cartridges includes a first catalyst configured to cause a release of hydrogen gas when exposed to the hydrogen liquid carrier, wherein each cartridge of the plurality of cartridges is individually removable from the housing through a corresponding one of the plurality of access ports;
    at least one gas outlet for expelling the hydrogen gas released in the modular device; and
    at least one liquid outlet for expelling the hydrogen liquid carrier.

2. The modular device of claim 1, wherein the at least one cartridge further includes:
    a central support structure wherein the at least one catalyst is mounted to the central support structure on one side.

3. The modular device of claim 1, wherein the at least one catalyst includes a plurality of catalysts and the at least one cartridge further includes:
    a central support structure with a first one of the plurality of catalysts attached to a first side of the central support structure, and a second one of the plurality of catalysts attached to a second side of the central support structure.

4. The modular device of claim 1, further including:
    a marginal cartridge disposed on at least one end of the modular device, the marginal cartridge including at least one second catalyst configured to cause a release of hydrogen gas when exposed to the hydrogen liquid carrier.

5. The modular device of claim 1 further comprising a cooling jacket disposed within the modular device, wherein the cooling jacket contains a cooling fluid.

6. The modular device of claim 5 wherein the cooling jacket is disposed within the at least one cartridge.

7. The modular device of claim 5 wherein the at least one catalyst is attached to the cooling jacket with a heat transfer medium.

8. The modular device of claim 1, wherein the hydrogen liquid carrier received from the inlet flows between the plurality of cartridges.

9. The modular device of claim 1, wherein the modular device further includes at least one canal within the housing, the at least one canal being configured to distribute the hydrogen liquid carrier from the inlet to the plurality of cartridges.

10. The modular device of claim 9, wherein the at least one canal includes:
   a main flow channel configured to receive the hydrogen liquid carrier from the inlet, and
   a plurality of branches connecting the main flow channel to a space between the plurality of cartridges.

11. The modular device of claim 1, wherein the at least one catalyst includes:
   a metal structure; and
   a catalytic coating on the metal structure, the coating including:
      an inner layer including Ni; and
      an outer catalyst layer.

12. The modular device of claim 11, wherein the Ni layer has a Ra roughness value between the range of 6.3-25 µm.

13. The modular device of claim 11, wherein the metal structure includes stainless steel.

14. The modular device of claim 1 wherein the at least one catalyst is arranged in a structured packing configuration.

15. A modular device for generating hydrogen gas from a hydrogen liquid carrier, the modular device comprising:
   a housing including a plurality of access ports;
   a plurality of inner cartridges arranged within the housing, wherein at least one inner cartridge of the plurality of inner cartridges includes at least one first catalyst configured to cause a release of hydrogen gas when exposed to the hydrogen liquid carrier;
   a first marginal cartridge disposed within the housing on a first end of the modular device and a second marginal cartridge disposed within the housing on a second end of the modular device, wherein:
      the first marginal cartridge includes at least one second catalyst configured to cause a release of hydrogen gas when exposed to the hydrogen liquid carrier, and
      the second marginal cartridge includes at least one third catalyst configured to cause a release of hydrogen gas when exposed to the hydrogen liquid carrier;
   a cooling system for removing heat generated within the modular device;
   at least one fuel inlet for receiving the hydrogen liquid carrier;
   at least one gas outlet for expelling the hydrogen gas generated in the modular device; and
   at least one liquid outlet for expelling the hydrogen liquid carrier,
   wherein each cartridge of the plurality of inner cartridges is individually removable from the housing through a corresponding one of the plurality of access ports.

16. The modular device of claim 15, wherein the at least one catalyst includes a plurality of catalysts and the at least one inner cartridge further includes:
   a central support structure with a first one of the plurality of catalysts attached to a first side of the central support structure, and a second one of the plurality of catalysts attached to a second side of the central support structure.

17. The modular device of claim 15, wherein the cooling system includes a cooling jacket disposed within the at least one inner cartridge, the cooling jacket containing a cooling fluid.

* * * * *